US009501551B1

(12) United States Patent
Weissgerber et al.

(10) Patent No.: US 9,501,551 B1
(45) Date of Patent: *Nov. 22, 2016

(54) AUTOMATIC ITEM CATEGORIZER

(71) Applicant: Amazon Europe Holdings Technologies SCS, Luxembourg (LU)

(72) Inventors: Peter Weissgerber, Trier (DE); Patrick Oliver Henning Reuther, Seinsfeld (DE); Carlos David Kalampokis, Seinsfeld (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/928,170

(22) Filed: Jun. 26, 2013

Related U.S. Application Data

(63) Continuation of application No. 12/605,260, filed on Oct. 23, 2009, now Pat. No. 8,489,603.

(51) Int. Cl.
*G06F 17/30* (2006.01)

(52) U.S. Cl.
CPC .............................. *G06F 17/30598* (2013.01)

(58) Field of Classification Search
CPC .................... G06F 17/30867; G06F 17/20598
USPC .......................................................... 707/737
See application file for complete search history.

(56) References Cited

U.S. PATENT DOCUMENTS

| | | | |
|---|---|---|---|
| 5,557,668 A | 9/1996 | Brady | |
| 5,724,418 A | 3/1998 | Brady | |
| 5,825,870 A | 10/1998 | Miloslavsky | |
| 5,943,670 A | 8/1999 | Prager | |
| 5,970,132 A | 10/1999 | Brady | |
| 6,026,087 A | 2/2000 | Mirashrafi et al. | |
| 6,144,670 A | 11/2000 | Sponaugle et al. | |

(Continued)

FOREIGN PATENT DOCUMENTS

| | | |
|---|---|---|
| CN | 101918939 A | 12/2010 |
| JP | 11112666 | 4/1999 |

(Continued)

OTHER PUBLICATIONS

"Question Categorization for a question answering system using a vector space model", Anna Hedstrom, Department of Linguistics and Philology, Jun. 9, 2005.*

(Continued)

*Primary Examiner* — Etienne Leroux
*Assistant Examiner* — Cindy Nguyen
(74) *Attorney, Agent, or Firm* — Knobbe, Martens, Olson & Bear, LLP

(57) ABSTRACT

A categorization service is described that automatically categorizes items of interest to a user. The user may possess an item that they wish to offer for sale using the network-based service. The user may prepare an electronic description of the item and submit this item information to a categorization service for categorization. Upon receipt, the categorization service may compare the item information to item category descriptions representing item categories of the network-based server in order to determine category recommendations for the item of interest. The recommended categories are returned to the user to enable the user to assign a category, selected from the category recommendations, to the item of interest.

29 Claims, 8 Drawing Sheets

(56) References Cited

U.S. PATENT DOCUMENTS

| | | |
|---|---|---|
| 6,173,052 B1 | 1/2001 | Brady |
| 6,195,657 B1 | 2/2001 | Rucker et al. |
| 6,199,096 B1 | 3/2001 | Mirashrafi et al. |
| 6,212,192 B1 | 4/2001 | Mirashrafi et al. |
| 6,310,941 B1 | 10/2001 | Crutcher et al. |
| 6,347,139 B1 | 2/2002 | Fisher et al. |
| 6,356,632 B1 | 3/2002 | Foster et al. |
| 6,360,216 B1 | 3/2002 | Hennessey et al. |
| 6,366,666 B2 | 4/2002 | Bengtson et al. |
| 6,389,132 B1 | 5/2002 | Price |
| 6,408,066 B1 | 6/2002 | Andruska et al. |
| 6,424,709 B1 | 7/2002 | Doyle et al. |
| 6,434,230 B1 | 8/2002 | Gabriel |
| 6,463,148 B1 | 10/2002 | Brady |
| 6,487,290 B1 | 11/2002 | Le Grand |
| 6,510,221 B1 | 1/2003 | Fisher et al. |
| 6,535,600 B1 | 3/2003 | Fisher et al. |
| 6,535,601 B1 | 3/2003 | Flockhart et al. |
| 6,560,330 B2 | 5/2003 | Gabriel |
| 6,654,744 B2 | 11/2003 | Katayama et al. |
| 6,661,889 B1 | 12/2003 | Flockhart et al. |
| 6,665,395 B1 | 12/2003 | Busey et al. |
| 6,707,811 B2 | 3/2004 | Greenberg et al. |
| 6,731,393 B1 | 5/2004 | Currans et al. |
| 6,751,600 B1* | 6/2004 | Wolin ............... G06F 17/30707 706/12 |
| 6,791,974 B1 | 9/2004 | Greenberg |
| 6,914,899 B2 | 7/2005 | Siegrist et al. |
| 6,925,165 B2 | 8/2005 | Cohen et al. |
| 6,928,433 B2 | 8/2005 | Goodman et al. |
| 6,934,381 B1 | 8/2005 | Klein et al. |
| 7,016,532 B2 | 3/2006 | Boncyk et al. |
| 7,028,020 B1 | 4/2006 | Keskar et al. |
| 7,075,921 B2 | 7/2006 | Siegrist et al. |
| 7,085,366 B2 | 8/2006 | O'Neil |
| 7,092,509 B1 | 8/2006 | Mears et al. |
| 7,158,628 B2 | 1/2007 | McConnell et al. |
| 7,197,479 B1 | 3/2007 | Franciscus de Heer et al. |
| 7,203,188 B1 | 4/2007 | Siegrist et al. |
| 7,222,085 B2 | 5/2007 | Stack |
| 7,315,518 B1 | 1/2008 | Siegrist |
| 7,349,917 B2 | 3/2008 | Forman et al. |
| 7,367,051 B1 | 4/2008 | Siegrist et al. |
| 7,403,652 B2 | 7/2008 | Boncyk et al. |
| 7,519,200 B2 | 4/2009 | Gokturk et al. |
| 7,542,610 B2 | 6/2009 | Gokturk et al. |
| 7,581,230 B2 | 8/2009 | Chen et al. |
| 7,599,950 B2 | 10/2009 | Walther et al. |
| 7,627,502 B2 | 12/2009 | Cheng et al. |
| 7,636,450 B1 | 12/2009 | Bourdev |
| 7,657,100 B2 | 2/2010 | Gokturk et al. |
| 7,706,521 B2 | 4/2010 | Gavagni et al. |
| 7,730,034 B1 | 6/2010 | Deflaux |
| 7,813,557 B1 | 10/2010 | Bourdev |
| 7,827,286 B1 | 11/2010 | Deflaux et al. |
| 7,840,521 B2 | 11/2010 | Aoki |
| 7,881,957 B1 | 2/2011 | Cohen et al. |
| 7,945,470 B1 | 5/2011 | Cohen et al. |
| 7,949,999 B1 | 5/2011 | Willeford et al. |
| 7,958,518 B1 | 6/2011 | Willeford et al. |
| 7,966,329 B1 | 6/2011 | Rukonic et al. |
| 8,001,124 B2 | 8/2011 | Svendsen |
| 8,001,125 B1 | 8/2011 | Magdalin et al. |
| 8,005,697 B1 | 8/2011 | Cohen |
| 8,051,040 B2* | 11/2011 | Johnson ............... G06Q 30/02 707/627 |
| 8,095,521 B2 | 1/2012 | Chan et al. |
| 8,108,260 B2 | 1/2012 | Maguire et al. |
| 8,145,662 B2 | 3/2012 | Chen et al. |
| 8,160,929 B1 | 4/2012 | Park et al. |
| 8,219,432 B1 | 7/2012 | Bradley et al. |
| 8,249,245 B2 | 8/2012 | Jay et al. |
| 8,271,987 B1 | 9/2012 | Willeford et al. |
| 8,340,275 B1 | 12/2012 | Brandwine et al. |
| 8,542,816 B2 | 9/2013 | Kaufman et al. |
| 8,600,035 B2 | 12/2013 | Jay et al. |
| 8,650,141 B2 | 2/2014 | Willcock |
| 2002/0016798 A1* | 2/2002 | Sakai ............... G06F 17/2755 715/234 |
| 2003/0169870 A1 | 9/2003 | Stanford |
| 2003/0220866 A1 | 11/2003 | Pisaris-Henderson et al. |
| 2004/0101127 A1 | 5/2004 | Dezonno et al. |
| 2004/0186778 A1 | 9/2004 | Margiloff et al. |
| 2005/0111653 A1 | 5/2005 | Joyce et al. |
| 2005/0138079 A1 | 6/2005 | Liu et al. |
| 2006/0002607 A1 | 1/2006 | Boncyk et al. |
| 2006/0006441 A1 | 1/2006 | Park et al. |
| 2006/0203993 A1 | 9/2006 | Busey et al. |
| 2006/0282442 A1 | 12/2006 | Lennon et al. |
| 2007/0104348 A1 | 5/2007 | Cohen |
| 2007/0160188 A1 | 7/2007 | Sharpe et al. |
| 2007/0201684 A1 | 8/2007 | Boghani |
| 2007/0208590 A1 | 9/2007 | Dorricott et al. |
| 2007/0279521 A1 | 12/2007 | Cohen |
| 2007/0286180 A1 | 12/2007 | Marquette et al. |
| 2007/0299743 A1* | 12/2007 | Staib et al. ............... 705/27 |
| 2008/0005118 A1 | 1/2008 | Shakib et al. |
| 2008/0071763 A1 | 3/2008 | Ferrenq et al. |
| 2008/0082426 A1 | 4/2008 | Gokturk et al. |
| 2008/0094417 A1 | 4/2008 | Cohen |
| 2008/0147470 A1 | 6/2008 | Johri et al. |
| 2008/0187125 A1 | 8/2008 | Siegrist |
| 2008/0229404 A1 | 9/2008 | Siegrist et al. |
| 2008/0260135 A1 | 10/2008 | Siegrist |
| 2008/0267377 A1 | 10/2008 | Siegrist |
| 2008/0276183 A1 | 11/2008 | Siegrist et al. |
| 2008/0288349 A1 | 11/2008 | Weisberg et al. |
| 2009/0010414 A1 | 1/2009 | Siegrist |
| 2009/0154688 A1 | 6/2009 | Jay et al. |
| 2009/0182622 A1 | 7/2009 | Agarwal et al. |
| 2009/0234849 A1 | 9/2009 | Erera et al. |
| 2009/0240652 A1 | 9/2009 | Su et al. |
| 2009/0261157 A1 | 10/2009 | Kumar et al. |
| 2009/0281967 A1 | 11/2009 | Jaffer et al. |
| 2009/0316687 A1 | 12/2009 | Kruppa |
| 2010/0070501 A1 | 3/2010 | Walsh et al. |
| 2010/0161620 A1 | 6/2010 | Lamere et al. |
| 2010/0241650 A1* | 9/2010 | Chittar ............... 707/769 |
| 2010/0281398 A1 | 11/2010 | Melideo |
| 2011/0051920 A1 | 3/2011 | Dashe et al. |
| 2011/0066498 A1 | 3/2011 | Wojcicki et al. |
| 2011/0087548 A1 | 4/2011 | Schauser et al. |
| 2011/0286444 A1 | 11/2011 | Petrovykh |
| 2011/0310891 A1 | 12/2011 | Howe et al. |
| 2011/0320200 A1 | 12/2011 | Broman et al. |
| 2012/0101865 A1 | 4/2012 | Zhakov |

FOREIGN PATENT DOCUMENTS

| | | |
|---|---|---|
| JP | 200257801 | 2/2002 |
| JP | 2002314691 | 10/2002 |
| JP | 200387411 | 3/2003 |
| WO | WO 98/01987 | 1/1998 |
| WO | WO 2009/091700 | 7/2009 |

OTHER PUBLICATIONS

"GoldenBullet: Automated classification of product data in E-commerce", Korotkiy et al., Business Information Systems, Proceedings of BIS 2002, Poznan, Poland.*

"Text Similarity Computing Based on Standard Deviation", School of Information Engineering, Beijing University of Posts and Telecommunications, Beijing 100876, China, Tao et al. Copy right 2005.*

U.S. Appl. No. 11/948,869, filed Nov. 30, 2007, Khoshnevisan, et al.

Amazon Mechanical Turk—Welcome, https://www.mturk.com/mturk/welcome, available as early as Aug. 28, 2008 [accessed Oct. 7, 2008].

Amazon Web Services Developer Community: What's that Tune?, http://developer.amazonwebservices.com/connect/entry.jspa?externalID=527, sample code originally posted Dec. 1, 2006,

(56) References Cited

OTHER PUBLICATIONS web site available at least as early as Jul. 15, 2008 [accessed Oct. 7, 2008].
Canadian Office Action in Application No. 7,703,737 dated Feb. 29, 2012.
Cohen, P., et al., Controlling Interaction With Users to Facilitate User Performance of Tasks, U.S. Appl. No. 10/990,771, filed Nov. 16, 2004.
Deflaux, N.A., et al., Managing Performance of Human Review of Media Data, U.S. Appl. No. 12/020,469, filed Jan. 25, 2008.
First Office Action in Chinese Application No. 200880115869.3, dated Aug. 2, 2012.
Kwiry—Text it Before You Forget IT, http://www.kwiry.com, web site available at least as early as Aug. 13, 2008 [accessed Oct. 7, 2008].
Nordstrom, P., Human Augmentation of Automated Tasks, U.S. Appl. No. 11/560,700, Nov. 16, 2006.
Notification of Co-Pending Applicattons of Assignee, Aug. 14, 2008.
NowNow.com, http://nownow.com/nownow/, web site available as of Aug. 28, 2008 [accessed Oct. 7, 2008].
Office Action in Canadian Application No. 2703737 dated Jul. 15, 2013.
Office Action in Canadian Application No. 2703740 dated Mar. 20, 2013.
Second Office Action in Chinese Application No. 200880115842.4 dated Apr. 1, 2013.
Second Office Action in Chinese Application No. 200880115869.3 mailed May 6, 2013.
What is Evernote?, Evernote Corporation, http://www.evernote.com/about/what_is_en/, web site available at least as early as Aug. 21, 2008 [accessed Oct. 7, 2008].
Willeford, J.C., et al., Transferring Entity-Related Data Between Storage Partitions, U.S. Appl. No. 11/842,730, filed Aug. 21, 2007.
Gietz, Peter: "Report on automatic classifications systems, for the TERENA activity Portal Coordination," www.daasi.de/reports, Jun. 19, 2001.
Co-pending U.S. Appl. No. 12/645,420, filed Dec. 22, 2009. Now Iss'd U.S. Pat. No. 8,805,838.
Co-pending U.S. Appl. No. 12/645,405, filed Dec. 22, 2009. Now Iss'd U.S. Pat. No. 8,510,307.

\* cited by examiner

AUTOMATIC ITEM CATEGORIZER

CROSS-REFERENCE TO RELATED APPLICATION

This application is a continuation of U.S. patent application Ser. No. 12/605,260, entitled AUTOMATIC ITEM CATEGORIZER, and filed Oct. 23, 2009, the entirety of which is incorporated herein by reference.

BACKGROUND

Generally described, computing devices and communication networks facilitate network-based commerce. For example, a user may employ his or her computing device to access a network-based retailer for the purchase of items and services (collectively and individually referred to as "items") such as music, books, and electronics, just to name a few.

To take advantage of this growing marketplace, sellers frequently elect to sell items through network-based retailers. For example, a book-seller may elect to sell books through a network-based retailer which offers books for sale. Accordingly, a seller may record some information regarding items they wish to offer for sale in an electronic form, such as a written description. This recorded item information may be provided to the network-based retailer to enable the item to be offered for sale by the network-based retailer.

Such a system may be problematic, however. Sellers may need to identify one or more categories into which their item(s) falls before they may be offered for sale. However, a network-based retailer may have many possible categories into which an item may possibly be categorized. Furthermore, different network-based services may categorize items into different categories. As a result, it may be difficult for a seller to identify an appropriate category for categorizing their item.

Furthermore, network-based retailers receiving item information submissions from a seller are faced with a difficult choice. The retailer may choose to accept seller submissions as they are received, with the possibility that the seller submissions may be mis-categorized. Alternatively, network-based services may revise seller submissions, which is a costly and time-consuming activity. Thus, categorization accuracy may be compromised if the retailer takes no action, while, categorization costs may be significantly increased if the retailer revises seller submissions.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
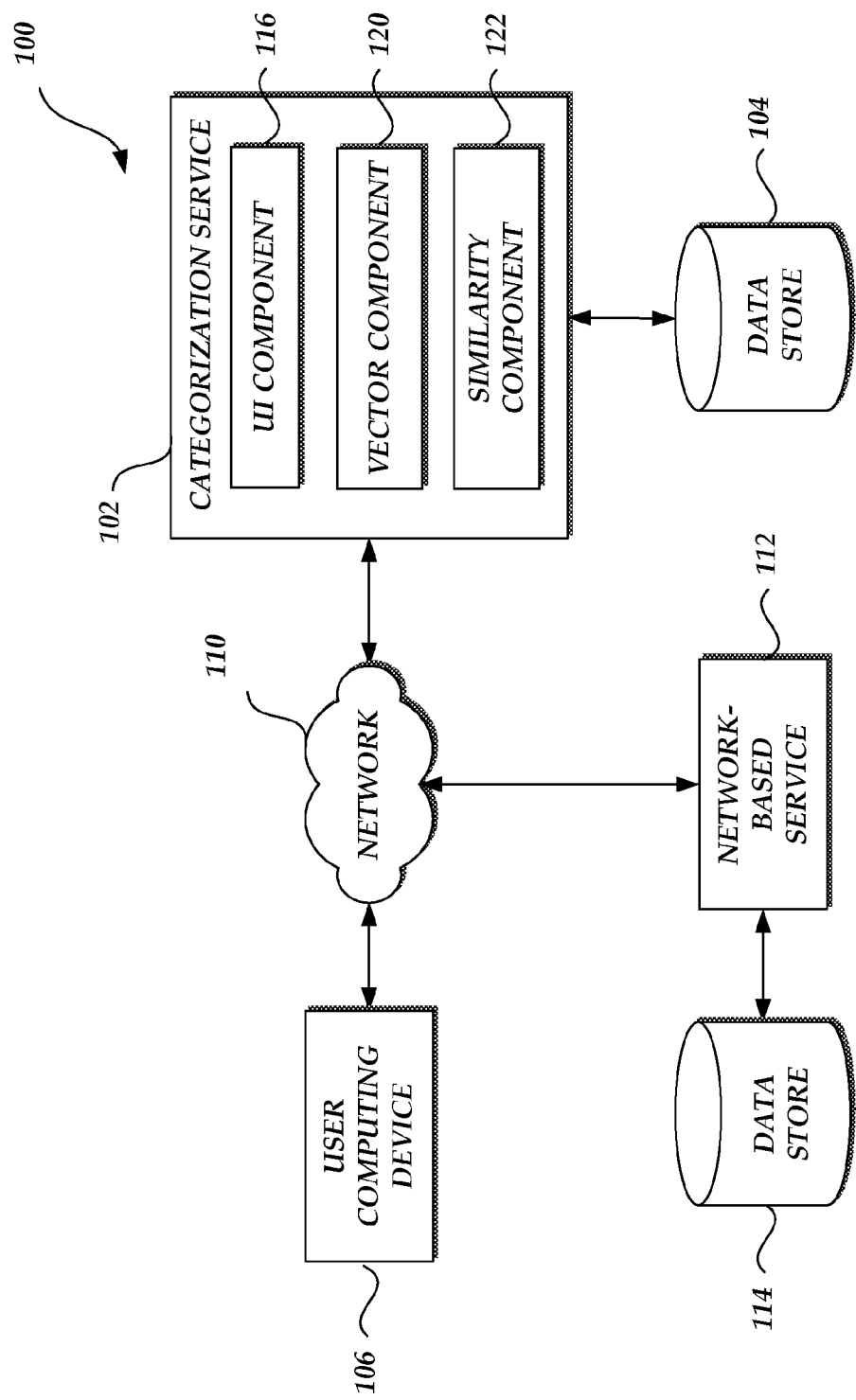
FIG. 1 is a block diagram depicting an illustrative operating environment in which a categorization service generates category recommendations for items of interest to a user.

Generally described, embodiments of the present disclosure relate to automatically categorizing items of interest to user (e.g., a seller of the item, such a manufacturer, wholesaler, or retailer) based upon associated item information. The items of interest may be categorized in accordance with item categories maintained by a network-based service (e.g., a website).

In this regard, a categorization service is described that categorizes the items of interest on behalf of the user. For example, a user employing a user computing device may possess an item that they wish to offer for sale using the network-based service. The item may be anything capable of being offered for sale, for example, any good, service, or information. Accordingly, the network-based service may include network-based retailers such as those which sell items for purchase to the customer, network-based sources of entertainment and/or information (e.g., network-based encyclopedias, media sharing, etc), network-based social networking services which enable users to share content with one another, and the like As will be described in more detail below, in certain embodiments, the user may prepare an electronic description of one or more items (e.g., a file including at least a written description) and submit the item information using a user composing device to a categorization service for categorization. In alternative embodiments, the item information may be retrieved from another source, rather than prepared by the user.

Upon receipt of the item information, the categorization service analyzes the item information and compares the item information to item categories descriptions representing item categories of a selected network-based server in order to determine category recommendations for the items of interest represented by the item information. The categorization service may receive the item information directly from the user computing device or via the network-based service. For example, the categorization service may generate a mathematical description of the item information and compare this to a mathematical description of the item category descriptions.

Based upon these mathematical descriptions, the degree of similarity between the item information and item category descriptions may be established. Categories having item category descriptions that are determined to be sufficiently similar to the submitted item information may be determined to be category recommendations. Categories having item category descriptions that are determined to lack sufficient similarity with the item information may be ignored as category recommendations.

These category recommendations may be further employed to assign one or more categories to the item of interest. In one embodiment, the category recommendations may be provided to the user computing device for display to the user in a user interface that enables the user to assign an item category selected from the category recommendations to an item of interest. In alternative embodiments, one or more of the category recommendations may be automatically assigned to the item of interest. For example, a selected number of category recommendations having the highest degree of similarity (e.g., top three, top five, and the like) may be assigned as categories for the item of interest.

As the categorization service employs mathematical representations of the item information and item category descriptions, recommended categories in accordance with item categories maintained by the network-based service may be generated automatically, without labor intensive manual effort. Furthermore, by enabling assignment of item categories from the recommended item categories, the risk of mis-categorizing a target item is minimized. For example, in one aspect, because the user (e.g., seller) submitting the item to the categorization service may be the most knowledgeable party concerning the item, the user may be in the best position to select from recommended categories in categorizing the item. Alternatively, automatically selecting categories from category recommendations having the highest degree of similarity provides a high degree of confidence in the accuracy of the assigned categories. As an additional benefit, the scope and variety of categorization that can be provided by the categorization service is virtually unlimited.

With reference to FIG. 1, an illustrative operating environment 100 is shown including a categorization service 102 that categorizes items of interest submitted by a user computing device 106. For example, as discussed in greater detail below, the categorization service determines item category recommendations based upon item information regarding an item of interest submitted by a user computing device 106. The item category recommendations are further determined based upon item categories maintained by a network-based service 112. Therefore, the categorized items may be employed in conjunction with the network-based service 112 (e.g., offered for sale).

It may be recognized that many of the components described below are optional and that embodiments of the system 100 may or may not combine components. Components need not be distinct or discrete. Components may be reorganized in the system 100. The system 100 may be represented in a single physical server containing all of the subsystems described below or, alternatively, the system may be split into multiple physical servers. For example, in certain embodiments, the categorization service 102 may be housed within the network-based service. In alternative embodiments, the categorization service 102 may comprise a stand-alone service. In additional embodiments, the categorization service 102 may be housed within one or more user computing devices.

The categorization service 102 and network-based service 112 may each be embodied in a plurality of components, each executing an instance of the respective categorization service 102 or network-based service 112. A server or other computing component implementing the categorization service 102 or network-based service 112 may include a network interface, memory, processing unit, and computer readable medium drive, all of which may communicate which each other may way of a communication bus. The network interface may provide connectivity over the network 110 and/or other networks or computer systems. The processing unit may communicate to and from memory containing program instructions that the processing unit executes in order to operate the categorization service 102 or network-based service 112. The memory generally includes RAM, ROM, and/or other persistent and auxiliary memory.

The user computing device 106 may comprise any computing device, such as a laptop or tablet computer, personal computer, personal digital assistant (PDA), hybrid PDA/mobile phone, mobile phone, electronic book reader, set-top box, camera, digital media player, and the like. The user computing device 106 may also be any of the aforementioned devices capable of receiving or obtaining data regarding an item of interest from another source, such as a digital camera, a remote control, another computing device, a file, etc.

In one embodiment, the user computing device 106 may communicate with the categorization service 102 and network-based service 112 via a communication network 110, such as the Internet or a communication link. Those skilled in the art will appreciate that the network 110 may be any wired network, wireless network or combination thereof. In addition, the network 110 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

In certain embodiments discussed below, the categorization service 102 of FIG. 1 may generate category recommendations in response to receipt of item information regarding items of interests to the user that are received from the user computing device 106. It may be understood, however, that the categorization service 102 may also be employed to generate category recommendations in response to receipt of item information regarding items of interest to the network-based service 112. For example, the network-based service 112 may maintain records of prior item information submissions. It may be desirable to provide this previously submitted item information to the categorization service 102 in order to verify and/or update the category assigned to the items represented by the previously submitted item information.

With further reference to FIG. 1, illustrative components of the categorization service 102 for use in categorizing items described by submitted item information will now be addressed. In one embodiment, the categorization service 102 includes a user interface component 116 for receiving item information from the user computing device 106. In a further embodiment, the categorization service 102 includes a vector component 120 for generating mathematical descriptions (e.g., vectors) of item and/or category description information. In an additional embodiment, the categorization service 102 includes a similarity component 122 for determining similarities between vectors and determining category recommendations on the basis of the determined similarities.

Generally described, the user interface component 116 generates user interfaces which enable a user of the user computing device 106 to interact with the categorization service 102. For example, as described in greater detail below, the user interface component 116 may generate a first user interface for display by the user computing device 106 that enables submission of item information to the categorization service 102 for categorization. The item information may be submitted in formats including, but not limited to, flat files and XML files. In alternative embodiments, a user employing the user computing device 106 may directly input item information without storing the item information in a file.

In another example, following the generation of category recommendations, the user interface component 116 may generate a second user interface for display by the user computing device 106. The second user interface may enable display of the category recommendations to the user and enable the user, via the user computing device 106, to select a category recommendation to be assigned to the item of interest.

The vector component 120 and similarity component 122 may be used to generate the category recommendations. In one aspect, the vector component 120 may be used to generate vectors from the received item information, referred to herein as item vectors. The item vectors comprise a mathematical representation of at least a portion of the text information included within the received item information. In certain embodiments, the vector component 120 may employ a vector space model to generate vectors. For example, each dimension of the vector may correspond to a separate term. Thus, if a term occurs in the item information, the value of that term in the item vector is non-zero.

In certain embodiments, the value of a term in an item vector may comprise the frequency with which the term occurs in the item information. In further embodiments, the values of each of the terms of the item vector may be further weighted, using weighting schemes understood in the art. Examples of such weighting schemes may include, but are not limited to, term frequency-inverse document frequency modeling (tf-idf).

The similarity component 122 may compare generated item vectors to at least one category vector in order to determine item recommendations for the item of interest represented by the item vector. In an embodiment, the category vector may comprise a mathematical representation of at least a portion of an item category description related to an item category. In another embodiment, the category vector may be generated by the vector component 120 in a manner similar to that described above for the item vector, with the exception that a category description employed instead of the item information. In a further embodiment, one or more category vectors may be obtained from an external source. Irrespective of the source of the category vectors, one or more category vectors may be stored in data store 104. In certain embodiments, the item category description may correspond to item categories employed by the network-based service 112 and may be retrieved from the network-based service 112.

The similarity component 122 determines a similarity between the generated item vector and at least one category vector in order to determine category recommendations. In one embodiment, the item category represented by the category vector may be considered to be a category recommendation if the similarity of the item of interest is amongst the most similar items (e.g., within the top one, within the top three, within the top five, etc.). In an alternative embodiment, the item category represented by the category vector may be considered to be a category recommendation if the similarity is greater than a threshold value.

The similarity may be determined through in a number of different operations. In one embodiment, the similarity may comprise the deviation of the angles between the item vector and the category vector under consideration. In another embodiment, the similarity may comprise the cosine of the angle between the item vector and the category vector under consideration. It may be understood that this description of similarities is not exhaustive and that other methods of calculating similarities known in the art may be employed within the scope of the disclosed embodiments.

Although described above as components of the categorization service 102, the user interface component 116, the vector component 120, and/or the similarity component 122 may be discrete services or components from the categorization service 102. Accordingly, the categorization service 102 may include one or more interface components for communication with the user interface component 116, the vector component 120, and/or the similarity component 122 via the network 110.

In additional embodiments, the categorization service 102 may be housed within one or more user computing devices 106 and operate as discussed above. For example, category vectors may be retrieved from data store 104. In another example, category vectors may be stored by the user computing devices 106 and pushed to the user computing devices 106 when updated. Beneficially, by locally storing category vectors and pushing updates to the user computing devices 106, the user computing devices 106 may not necessarily need to be in communication with the network in order for the categorization service 102 to categorize items of interest to the user.

Figure 2:
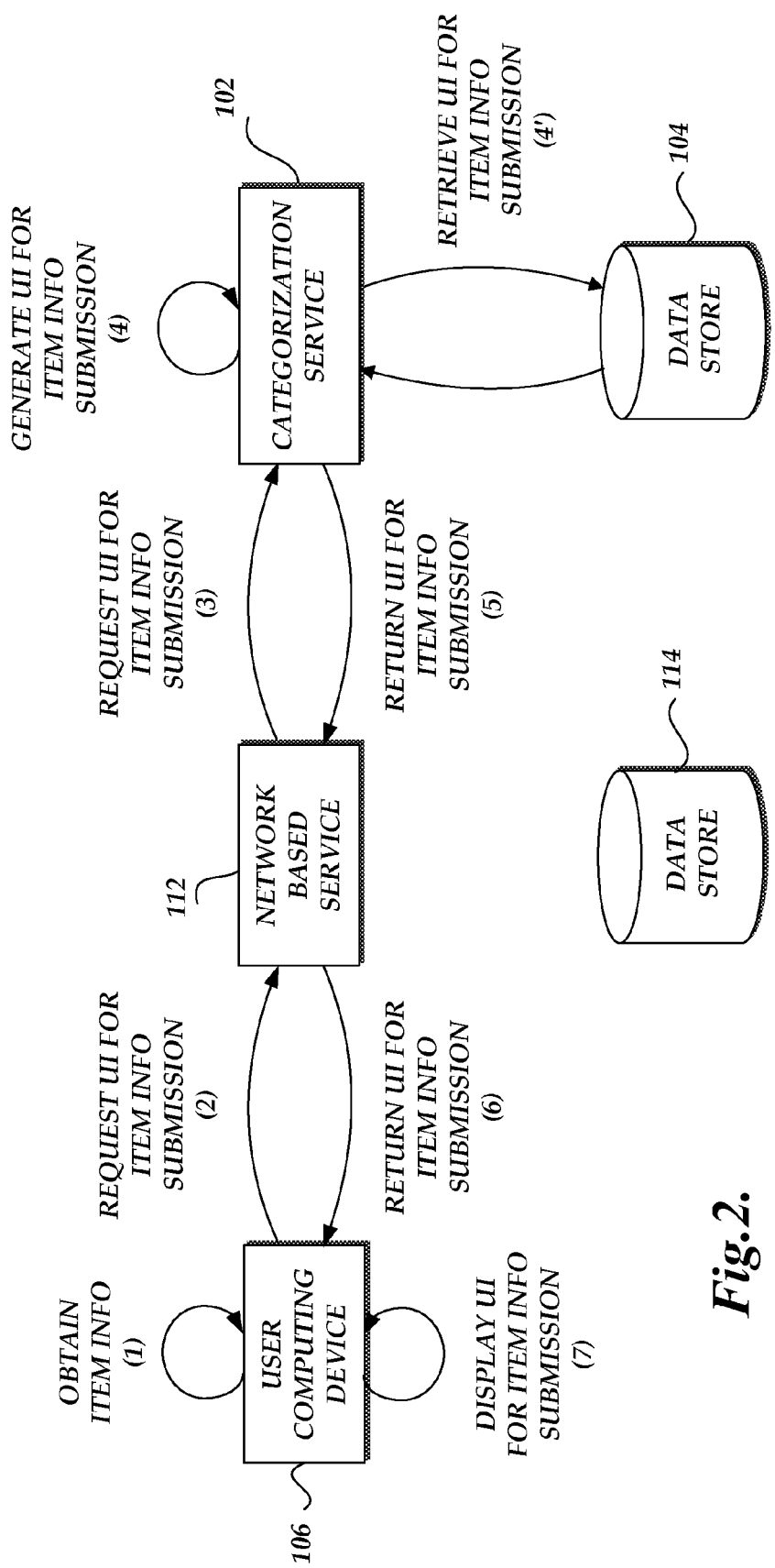
FIG. 2 is a block diagram of the operating environment of FIG. 1, illustrating the categorization service providing a user interface to a user computing device for submission of item information in response to a request from the user computing device.

FIG. 2 is a block diagram of the operating environment of FIG. 1, illustrating the categorization service 102 providing a user interface to a user computing device for submission of item information in response to a request from the user computing device. The item information may be determined by the user computing device 106 and/or may be retrieved from another source for submission to the network-based service 112. As noted above, the item of interest may be any good, service, or information. The item information may also take a variety of forms depending on item and/or the type of user computing device 106.

As further illustrated in FIG. 2, the user may request a user interface from the network-based service 112 for submission of item information using the user computing device 106. For example, the request may comprise a request for a web page containing the desired item information input fields. The request may be transmitted to the network-based service 112, which detects that a user interface enabling item information to be submitted is needed to respond to the user request and forwards the request to the categorization service 102.

The categorization service 102, in turn, may submit the request for a user interface to the user interface component 116. In an embodiment, the user interface component 116 may generate and return a user interface enabling submission of item information. In another embodiment, the user interface component may retrieve a user interface from the data store 104. The user interface generated by the categorization service 102 for item information submission may be further transmitted to the network-based service 112 for ultimate presentation to the user.

Figure 3:
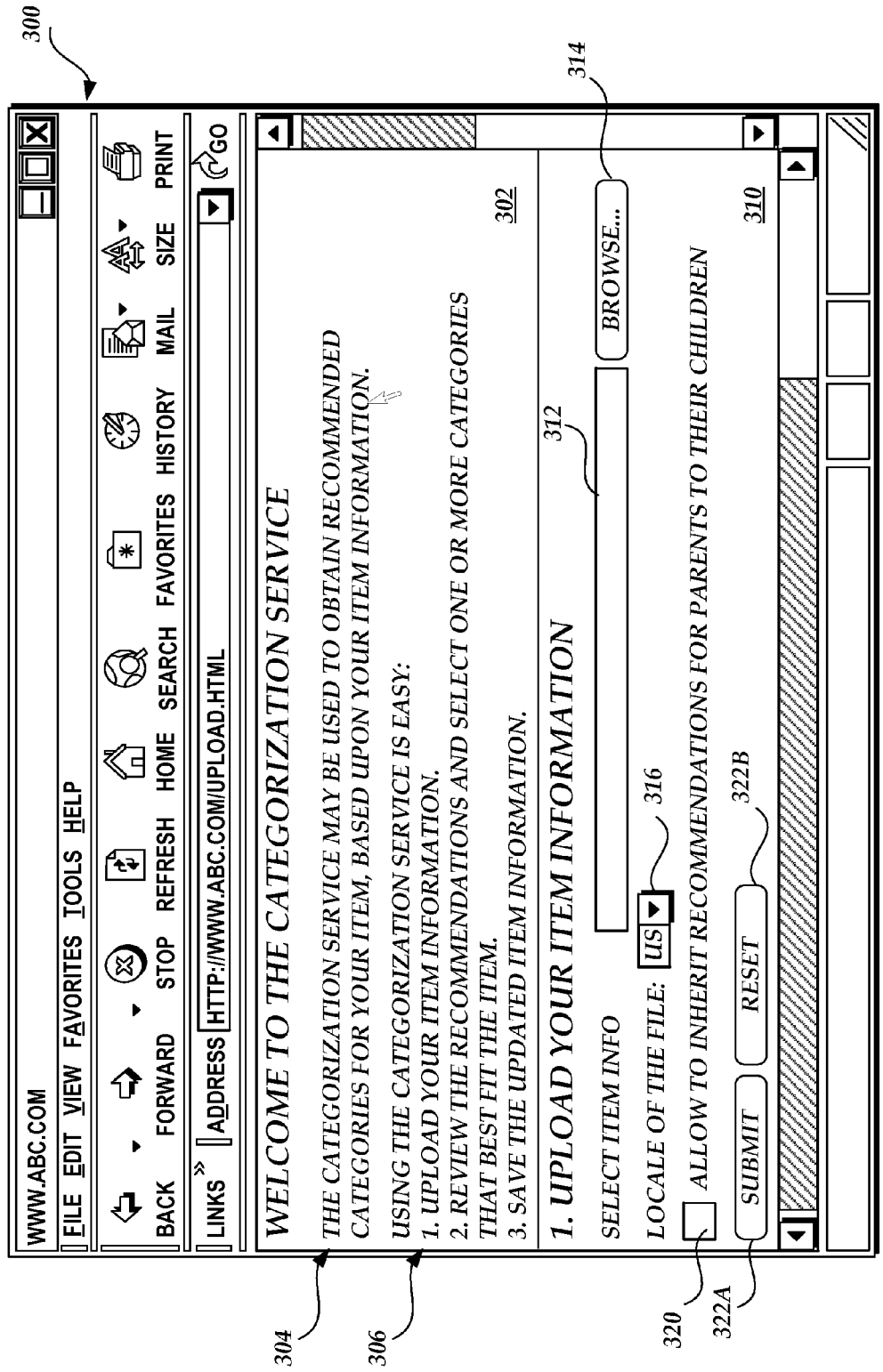
FIG. 3 is an illustrative user interface for display on the user computing device for enabling a user to submit item information to the categorization service.

FIG. 3 illustrates one embodiment of a user interface 300 that is displayed on the user computing device 106 for submission of item information. The user interface 300 includes a first window 302 which includes a greeting 304 and instructions 306 for use of the user interface 300. The instructions 306 may include a step-by-step overview of the operations involved in the item categorization process, in order to familiarize the user with the process. Sample instructions 306 may include "1. Upload your item information," "2. Review the recommendations and select one or more categories that best fit the item," and "3. Save the updated item information."

The user interface 300 may further include a second window 310 for submission of item information. In one aspect, the second window 310 may include a field 312 for identifying a location of one or more files containing the item information. A user interface control 314 may be further provided for navigating through directory structures of memory devices (e.g., local or network storage) in communication with the user computing device 106 in order to identify the location of the file or files containing the item information. As necessary, a locale 316 of the item information file may be selected, as necessary, in order to provide proper interpretation of the file or files containing the item information.

The user interface 300 may also provide the user with an interface option 320 to have recommendations selected for parent items to be inherited by their children. For example, assume that an item to be categorized is a T-shirt. Further assume that other items to be categorized are the same T-shirt, with variations such as size, color, and the like. In this example, an item categorized as "T-shirt" may be considered a parent, while an item categorized as "T-shirt, blue, X-Large" may be considered a child of that parent. Thus, the by selection of the interface option 320, any selections made for the parent item are also inherited by the child item.

As discussed in greater detail below, selection of the interface option 320 also causes display of child items along with their parents. When making selections for the parents, the user may determine to which children the parent selections are to be applied. In certain embodiments, as a default, parent selections may be applied to those children that have the same category recommendations as their parent.

Once the user has provided the location of the item information and, optionally, made selections regarding the locale and inheriting recommendations, the item information may be transmitted (e.g., uploaded) to the categorization service 102 for generation of category recommendations. If the user is satisfied with their selections, the user may select a user interface control 322A submit the item information. If, however, the user is not satisfied with their selections, the user may select a user interface control 322B in order to reset the user interface 300 and clear any information previously entered.

Figure 4A:
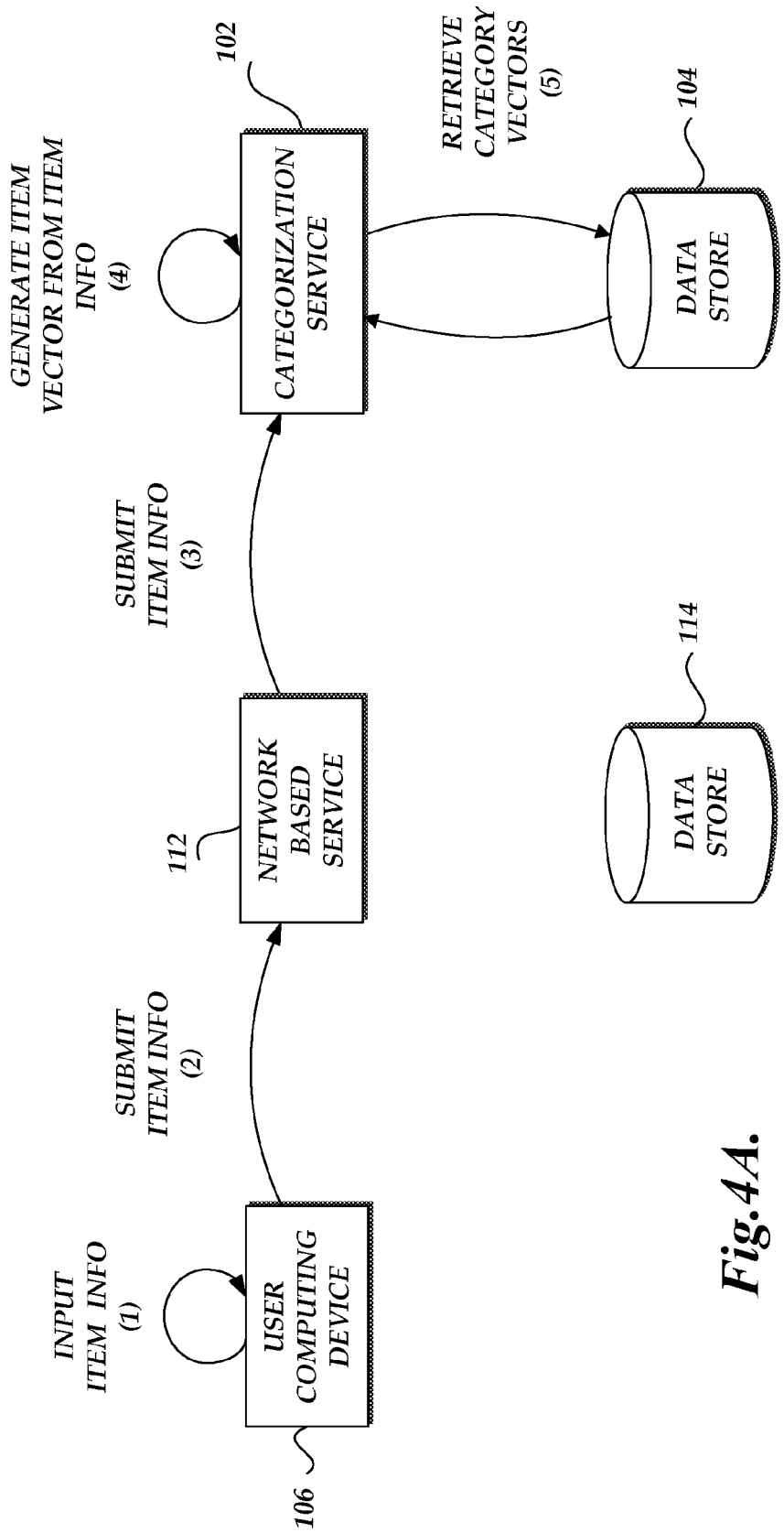
FIG. 4A is a block diagram of the operating environment of FIG. 1, illustrating submission of item information by the user computing device to the categorization service.

FIG. 4A is a block diagram of the operating environment 100 of FIG. 1, illustrating submission of item information to the categorization service 102 by the user computing device 106. A user, upon receiving the user interface enabling submission of item information for an item of interest, may decide that they wish to categorize the item. A request to categorize the item may be submitted, for example, by identifying one or more files containing item information and submitting this item information by selecting the user interface control 322A in user interface 300. Upon receipt of the request, the network-based service 112 submits the request to the categorization service 102, which in turn generates category recommendations based upon the received item information.

Although the request regarding categorization of the item is depicted in FIG. 4A as submitted by the user computing device 106, those skilled in the art will appreciate that the request may be submitted from another computing device utilized by the user. Upon receipt of the item information, the categorization service 102 may obtain vectors in order to facilitate the generation of category recommendations. In one aspect, an item vector may be generated from the item information using the vector component 120 of the categorization service 102. In another aspect, the categorization service 102 may retrieve one or more category vectors from the data store 104.

Figure 4B:
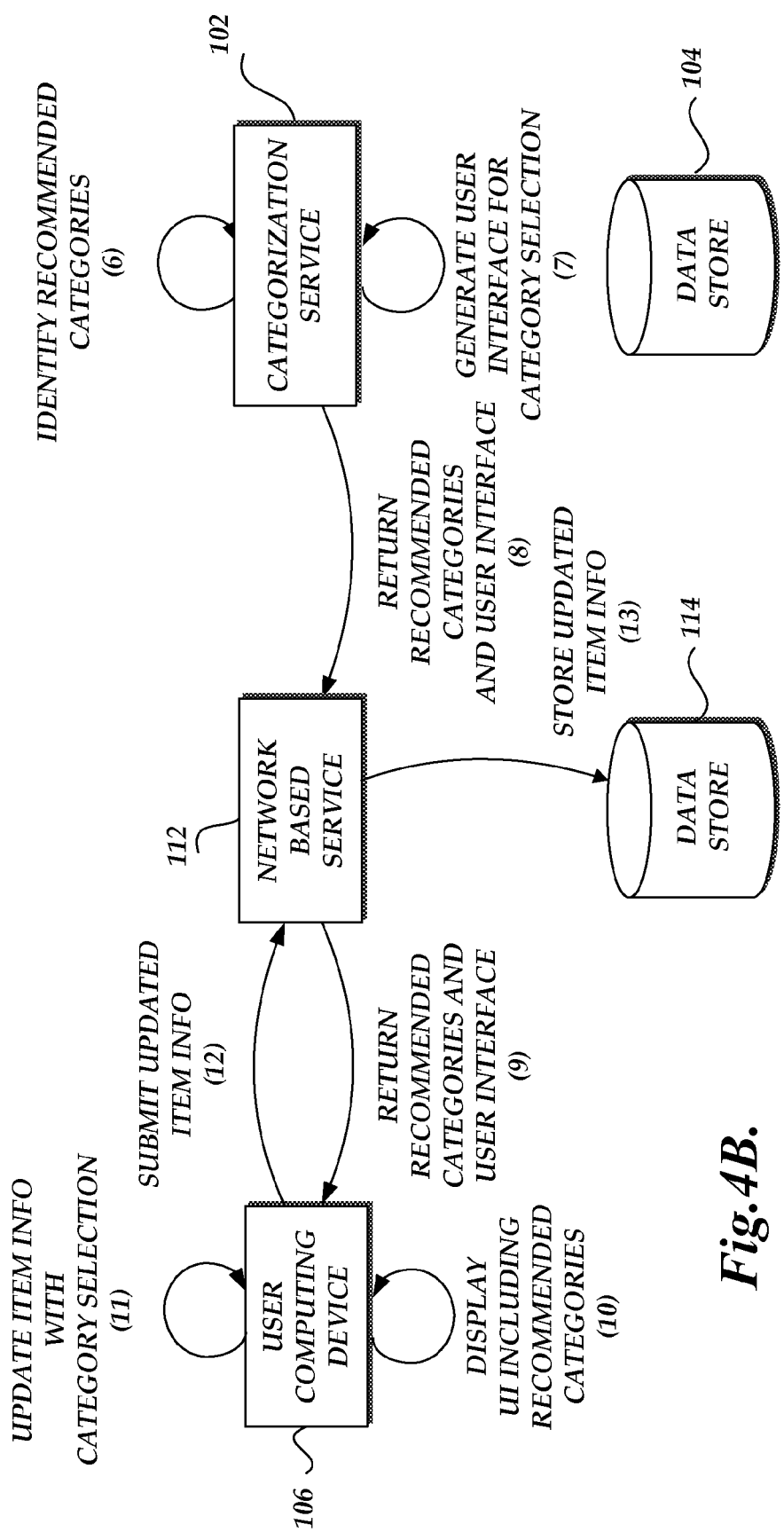
FIG. 4B is a block diagram of the operating environment of FIG. 1 illustrating the categorization service returning recommended categories to the user computing device in response to the received item information.

After the categorization service 102 obtains the item and category vectors, the categorization service 102 proceeds to generate category recommendations and user interfaces for selection of one or more category recommendations for the item of interest. FIG. 4B is a block diagram of the operating environment 100 of FIG. 1, illustrating receipt of the item and category vectors by the categorization service 102. In one aspect, comparisons may be made between the item and category vectors using the similarity component 122 of the categorization service 102. Based upon the results of the similarity comparison, category recommendations for the item of interest represented by the item information may be identified.

In another aspect, the user interface component 116 of the categorization service 102 may provide a user interface enabling review and assignment of one or more category recommendations to the item of interest. In an embodiment, the user interface component 116 may generate such a user interface. In another embodiment, the user interface component may retrieve such a user interface from the data store 104. The user interface generated by the categorization service 102 for category recommendation review and submission may be further transmitted to the network-based service 112 for ultimate presentation to the user.

As further illustrated in FIG. 4B, the user may review the category recommendations displayed in the user interface and assign an item category to the item of interest from the category recommendations. The item information may be further updated to reflect the assigned item category. Once the item information is updated, the updated item information may be transmitted to the network-based service for storage in data store 114.

Figure 4C:
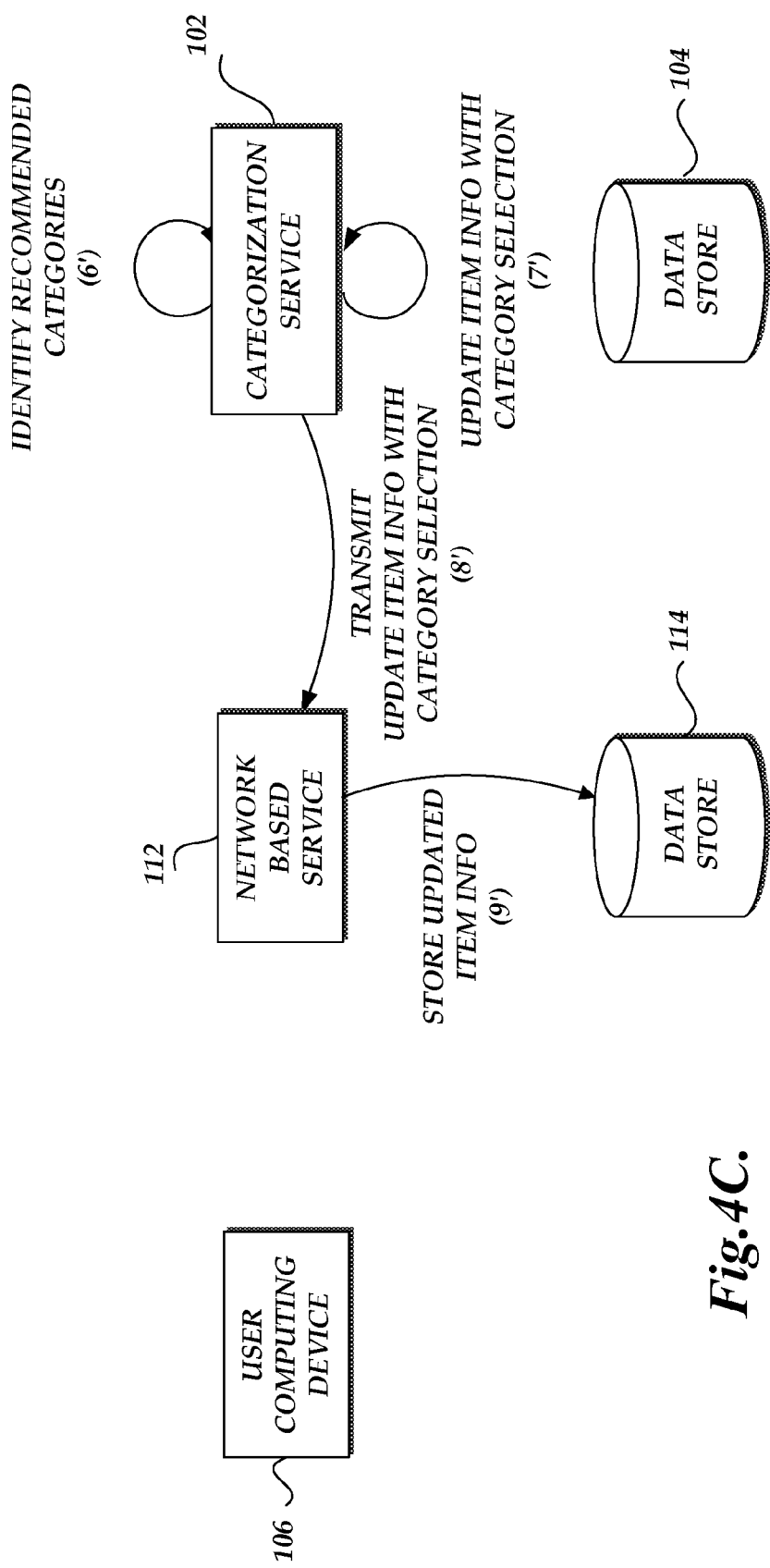
FIG. 4C is a block diagram of the operating environment of FIG. 1, illustrating the categorization service automatically selecting one or more recommended categories as item categories for assignment to an item of interest.

FIG. 4C is a block diagram of the operating environment 100 of FIG. 1, illustrating an embodiment of the categorization service 102 which automatically selects one or more recommended categories as item categories for assignment to an item of interest. As discussed above, the item and category vectors may be received by the categorization service 102 and comparisons may be made between the item and category vectors using the similarity component 122 of the categorization service 102 to identify category recommendations for the item of interest. In one embodiment, the categorization service 102 may assign at least one of a selected number of the most similar category recommendations (e.g., top one, top three, top five, etc.) as item categories for the item of interest. The item information may be further updated to reflect the one or more assigned item categories. Once the item information is updated, the updated item information may be transmitted to the network-based service 112 for storage in the data store 114.

Figure 5:
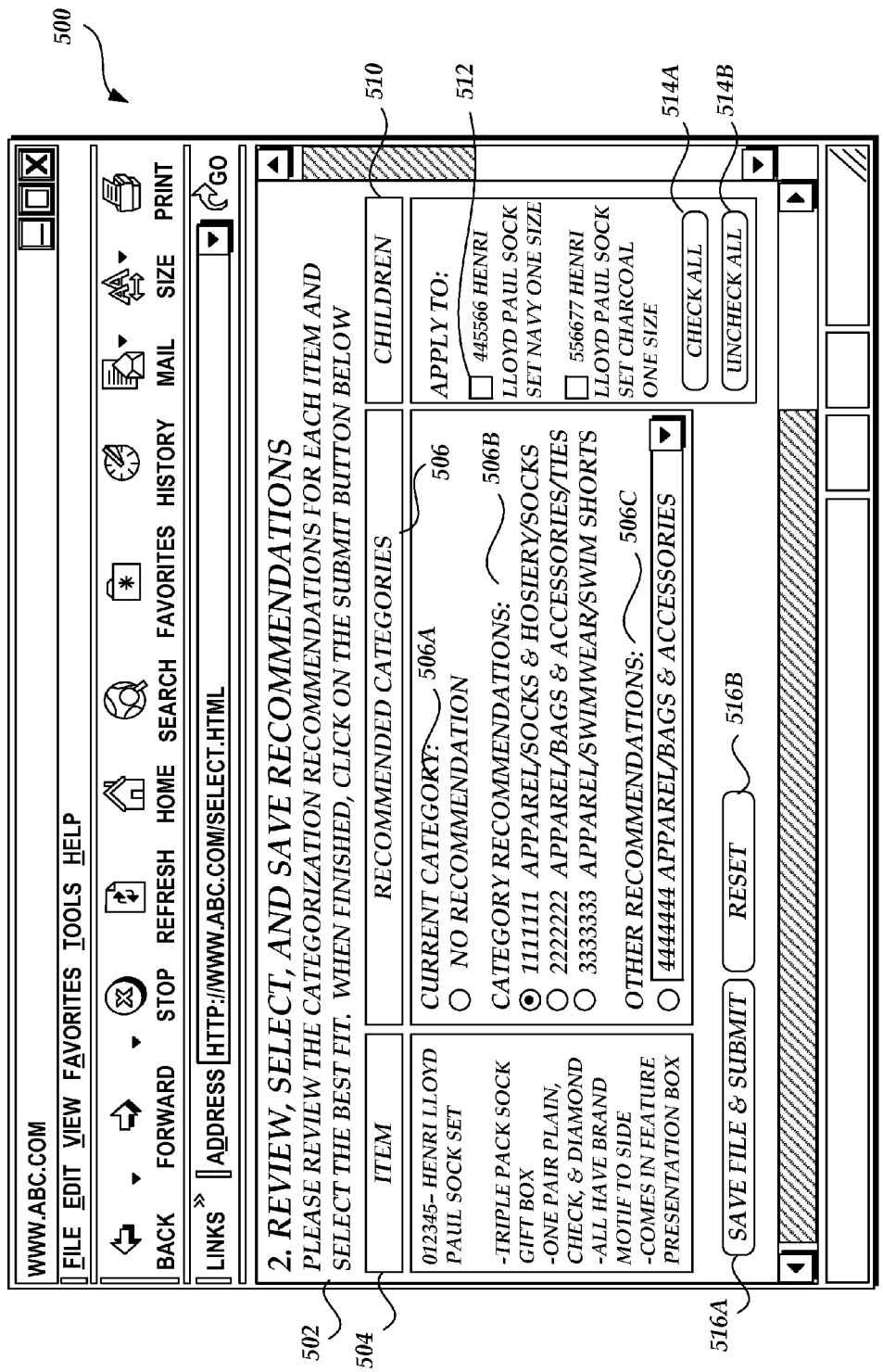
FIG. 5 is an illustrative user interface for display on the user computing device for enabling a user to review recommended categories for the item of interests, assign at least one category from the recommended categories to the items of interest, and update the item information concerning the items of interest to include the assigned category.

FIG. 5 illustrates one embodiment of a user interface 500, including category recommendations that are displayed on the user computing device 106. The user interface 500 includes an instruction frame 502, item frame 504, recommended categories frame 506, and children frame 510.

The instruction frame 502 may provide the user with instructions for employing the user interface 500. For example, as illustrated in FIG. 5, the instruction frame 502 indicates that the user should review categorization recommendations for the listed items and identify one or more category recommendations which appear to most closely match or fit the item. The user is further instructed to submit their selections when finished.

The item frame 504 lists the items which are identified within the submitted item information by the categorization service 102. The item frame 504 further lists a description of the identified item. The item description may include any information which is deemed pertinent to the characteristics of the item.

In certain embodiments, the categorization service may employ programmed logic in order to identify the items of interest listed within the item information. In one aspect, the items and item descriptions may be identified by searching for selected fields within the item information, such as "title," "item name," "item description," and the like. In another aspect, the categorization service 102 may identify items and item descriptions by searching for terms that are likely to be related to an item or item description. As illustrated in FIG. 5, an item entitled, "Henri Lloyd Paul sock set" is identified. An item description is also provided, which indicates the sock set is a gift box. The item description further indicates the pattern of the socks contained in the gift box, as well as the location of a brand motif and that the gift box is a feature presentation box.

The recommended categories frame 506 may list the category recommendations which are determined by the categorization service for the item. The category recommendations 506 may be further subdivided, for example, into current category 506A, recommended categories 506B, and other recommended categories 506C.

The current category 506A reflects a current value of category which is assigned to the item. In one embodiment, the current category 506A may be read from a "category" field of the item information. For example, the current category 506A may reflect a category which the user has selected for the item and entered into the item information. In certain embodiments, if the user has disclosed a category recommendation for the item of interest within the item information (i.e., an embedded category recommendation), this category recommendation may be selected by default. Absent the recitation of a category recommendation within the item information, the current category 506A may indicate "No Recommendation."

In another example, the current category 506A may reflect a category assignment for the item which was previously made by submission of the item information for categorization. If new category recommendations become available, it may be advantageous for an item to be resubmitted to the categorization service to verify that a previously assigned category remains correct.

The category recommendations 506B reflect category recommendations which have been determined for the item based upon the item information submitted to the categorization service 102. For example, a selected number of category recommendations (e.g., 3, 5, 10, and the like) may be displayed to the user in the user interface 500. The displayed category recommendations may further reflect the item categories which have been determined to be the most similar to the item information. In this manner, only the categories most likely to reflect the item are recommended to the user. Continuing the example begun above, for the "Henri Lloyd Paul Sock Set," a selected number of category recommendations are displayed, such as "Apparel/Socks & Hosiery/Socks," "Apparel/Bags & Accessories/Ties," and "Apparel/Swimwear/Swim Shorts."

The user interface 500 further provides other recommendations 506C for consideration by the user. The other recommendations 506C reflect recommended categories which are identified by the categorization service but which do not fall within the most similar category recommendations displayed within the category recommendations. The user may choose to review the other recommendations 506C, for example, if the user finds the category recommendations 506B to be unsatisfactory.

As discussed above, the user interface 300 provides the user with the option to apply recommendations assigned to parent items to child items. The children frame 510 presents the children identified for the item displayed in the item frame 504. In certain embodiments, if the interface option 320 is not selected in the user interface 300, then the children frame 510 may be omitted from user interface 500. Continuing the example begun above, the item "Henri Lloyd Paul Sock Set" is identified to have children "Henry Lloyd Paul Sock Set Navy One Size" and "Henry Lloyd Paul Sock Set Charcoal One Size." For each child item, the user may choose an interface option 512. By selection of the interface option 512, the child item may inherit the assigned category of the parent item under consideration.

The user interface 500 further comprises user interface controls 516A, 516B. When the user has completed reviewing the recommended categories and selected a category for assignment to the item of interest, the user may select user interface control 516A. With selection of user interface control 516A, the item information may be updated with the assigned item category. The updated item information may be further transmitted to the network-based service 112 for storage. If, however, the user is not satisfied with their selections, the user may select a user interface control 516B in order to reset any selections made in user interface 500.

In further embodiments, the user may not select any of the category recommendations. For example, the user may wish to consider the recommended categories in greater detail and, therefore, defers their selection. The item information may be updated to reflect this choice with a null value. The item information may be further provided to the categorization service 102 at a later time to continue the categorization process and assign one or more categories to the item of interest, as discussed above.

The user interface 500 has illustrated and described for the assignment of a category to a single item. It may be understood, however, that the item information may comprise information regarding many items. Therefore, the user interface may display multiple items, and their respective recommended categories and children, for review and selection by the user without limit.

Figure 6:
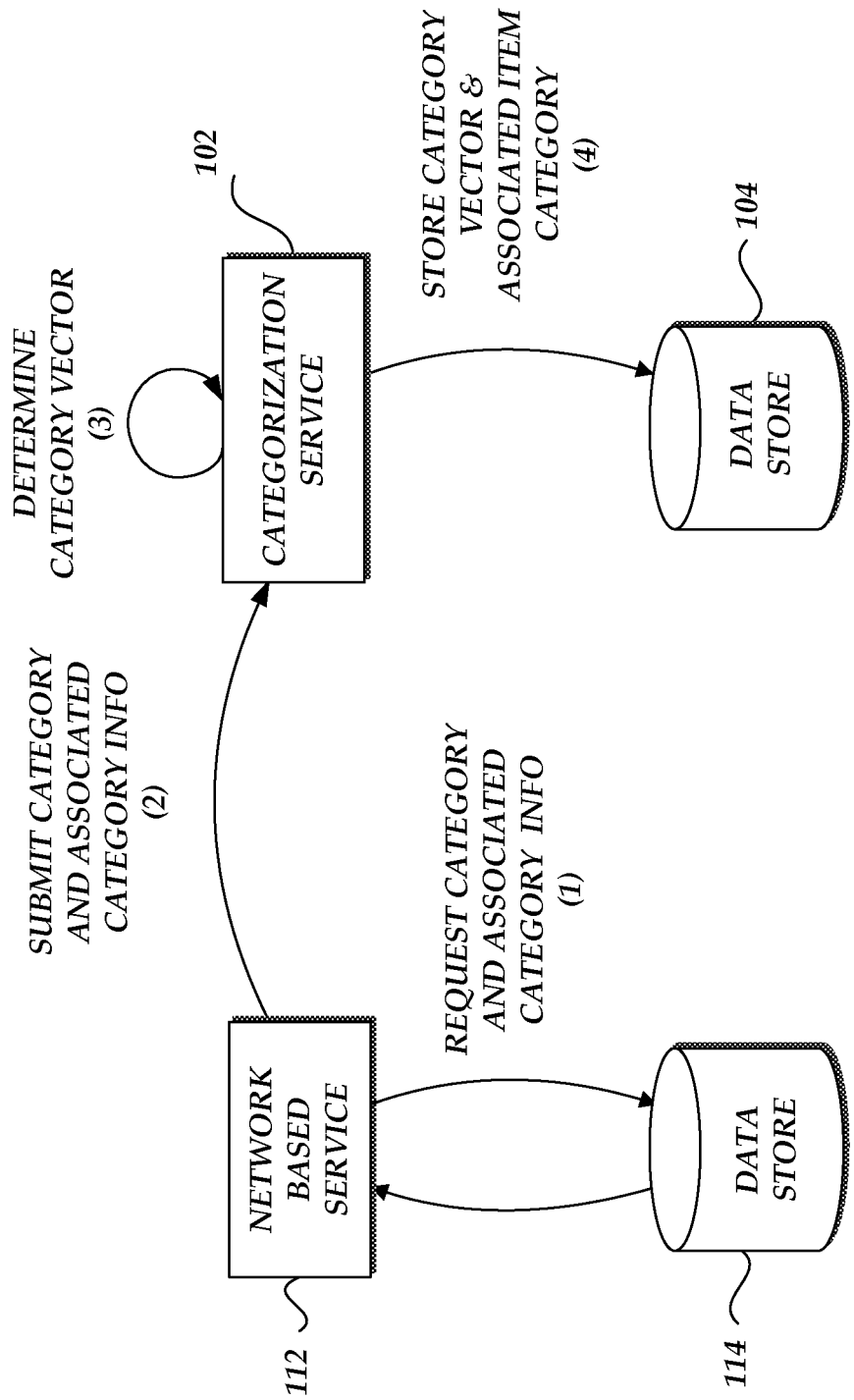
FIG. 6 is a block diagram of the operating environment of FIG. 1, illustrating a network-based service submitting a request to the categorization service to generate a category vector for item categories of interest based upon submitted item information associated with the item categories.

FIG. 6 is a block diagram of the operating environment of FIG. 1, illustrating the generation of category vectors by the categorization service 102. As discussed above, in certain embodiments, the categorization service 102 may be operative to generate and store category vectors pertaining to item categories maintained by the network-based service 112. Such category vectors may be established in advance of or concurrently with the item vectors so as to facilitate the generation of category recommendations for a category of interest.

As illustrated in FIG. 6, the network-based service 112 may request selected categories and associated category information from the data store 114. This information may then be transmitted to the categorization service 102 for the determination of category vectors. The category vector may be generated from the category information using the vector component 120 of the categorization service 102, as discussed above. The generated category vector may subsequently be stored in the data store 104 for later retrieval and use.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for categorizing items, the system comprising:
   a data store that stores item information related to a first plurality of items offered for sale using a network-based service; and
   a computing device having one or more processors, wherein the computing device is configured to operate the network-based service and is in communication with the data store, and wherein the network-based service is operative to:
   receive a request for a category recommendation for an item of the first plurality of items, the request including first item information associated with the item; and
   submit the first item information to a categorization service, wherein the categorization service is operative to:
   generate an item vector from the first item information according to a vector space model;
   compare the item vector to at least one category vector, wherein the at least one category vector comprises a representation of at least a portion of a textual description of an item category according to the vector space model, wherein the item category is maintained by the network-based service and associated with a second plurality of items;
   determine the category recommendation to be the item category when a deviation of an angle between the item vector and the at least one category vector is less than a threshold value; and
   update the first item information to include the item category.

2. The system of claim 1, wherein the categorization service is further operative to transmit the updated first item information to the network-based service.

3. The system of claim 2, wherein the network-based service is further operative to store the updated first item information in the data store.

4. The system of claim 1, wherein the first item information comprises at least one of a flat file, an XML file, or information directly input by a user.

5. The system of claim 1, wherein a value of a term in the item vector is determined based on a frequency with which the term occurs in the first item information and a term frequency-inverse document frequency of the term.

6. A system for categorizing items of interest, the system comprising:
   a data store adapted to maintain one or more descriptions for one or more item categories, wherein each item of a plurality of items offered for sale using a network-based service is associated with at least one of the one or more item categories; and
   a computing device having one or more processors, wherein the computing device is adapted to operate a categorization service and is in communication with the data store, and wherein the categorization service is operative to:
   generate item information associated with a first item of the plurality of items;
   compare the item information to a first description in the one or more descriptions maintained in the data store; and
   determine at least one category recommendation to be a first item category based on a similarity of the item information and the first description, wherein the first description is a textual description of the first item category; and
   assign the first item category to the first item,
   wherein the item information is represented as an item vector according to a vector space model and a category vector according to the vector space model comprises a representation of at least a portion of the first description, and
   wherein the at least one category recommendation is automatically determined to be the first item category if a deviation of an angle between the item vector and the category vector is less than a threshold value.

7. The system of claim 6, wherein the categorization service is further operative to determine at least one category recommendation to be a second item category based on a similarity of the item information and a second description in the one or more descriptions maintained in the data store, wherein the second description is a description of the second item category.

8. The system of claim 7, wherein the categorization service is operative to assign the first item category to the first item by automatically selecting the first item category from the at least one category recommendation.

9. The system of claim 7, wherein the categorization service is operative to assign the first item category to the first item based on a selection of the first item category by a human reviewer from the at least one category recommendation.

10. The system of claim 9, wherein the categorization service is further operative to provide the at least one category recommendation to a computing device having one or more processors, wherein the computing device is operative to:
present the at least one category recommendation to the human reviewer; and
receive a selection by the human reviewer of the first item category.

11. The system of claim 6, wherein the categorization service is further operative to update the item information to include the first item category.

12. The system of claim 11, wherein the categorization service is further operative to transmit the updated item information to a computing device in communication with another data store.

13. The system of claim 6, wherein the item information comprises at least one of an item title and an item description.

14. The system of claim 6, wherein the item information comprises at least one of a flat file, an XML file, or information directly input from a user.

15. The system of claim 6, wherein a value of a term in the item vector is determined based on a frequency with which the term occurs in the item information and a term frequency-inverse document frequency of the term.

16. A computer-implemented method for categorizing, on behalf of a user, one or more items of a plurality of items in item categories maintained by a network-based service, the method comprising:
under control of one or more computer systems:
comparing item information with at least one description for a first item category in the item categories maintained by the network-based service to determine a similarity between the item information and the at least one description, wherein the at least one description is a textual description of the first item category, wherein the item information is related to a first item in the plurality of items, wherein the first item is an item offered for sale using the network-based service, and wherein the first item category is associated with at least one item in the plurality of items;
automatically determining the first item category to be at least one category recommendation for the first item based on the similarity between the item information and at least one description;
enabling selection of the first item category for assignment to the first item,
wherein the item information is represented as an item vector according to a vector space model and a category vector according to the vector space model comprises a representation of at least a portion of the at least one description, and
wherein the first item category is automatically determined to be the at least one category recommendation if a deviation of an angle between the item vector and the category vector is less than a threshold value.

17. The computer-implemented method of claim 16, further comprising
comparing the item information with at least one second description for a second item category in the item categories maintained by the network-based service to determine a similarity between the item information and the at least one second description; and
automatically determining the second item category to be at least one category recommendation for the first item based upon the similarity between the item information and at least one second description.

18. The computer-implemented method of claim 17, wherein enabling selection of the first item category comprises enabling automatic selection of the first item category from the at least one category recommendation.

19. The computer-implemented method of claim 17, wherein enabling selection of the first item category comprises enabling selection of the first item category from the at least one category recommendation by a human reviewer.

20. The computer-implemented method of claim 19, wherein enabling selection of the first item category by the human reviewer comprises:
generating a user interface that enables a human reviewer to select the first item category from the at least one category recommendation; and
transmitting the user interface and the at least one category recommendation to another computing device for display to the human reviewer.

21. The computer-implemented method of claim 16, further comprising updating the item information to include the first item category.

22. The computer-implemented method of claim 21, further comprising transmitting the updated item information to a computing device in communication with a data store.

23. The computer-implemented method of claim 16, wherein the item information comprises at least one of an item title and an item description.

24. The computer-implemented method of claim 16, wherein the item information comprises at least one of a flat file, an XML file, or information directly input by the user.

25. The computer-implemented method of claim 16, wherein a value of a term in the item vector is determined based on a frequency with which the term occurs in the item information and a term frequency-inverse document frequency of the term.

26. A non-transitory computer-readable medium having encoded thereon instructions, wherein the instructions, when executed by a computing apparatus, cause the computing apparatus to:
generate a first user interface for receiving, from a user, item information regarding at least one item of interest to the user, wherein the item of interest is an item offered for sale using a network-based service; and
automatically determine at least one category recommendation from vector representations of the item information and at least one description for an item category maintained by the network-based service, wherein the at least one description is a textual description of the first item category, wherein the item category is associated with a plurality of items and is determined to be a category recommendation if a deviation of an angle between the vector representations of the item information and the at least one description is less than a threshold value,
wherein the item information is represented as an item vector according to a vector space model and a category vector according to the vector space model comprises a representation of at least a portion of the at least one description.

27. The non-transitory computer-readable medium of claim 26, wherein the item information comprises at least one of an item title and an item description.

28. The non-transitory computer-readable medium of claim 26, wherein the item information comprises at least one of a flat file, an XML file, or information directly input by a user.

29. The non-transitory computer-readable medium of claim 26, wherein a value of a term in the item vector is determined based on a frequency with which the term occurs in the item information and a term frequency-inverse document frequency of the term.

\* \* \* \* \*